(12) United States Patent
McNally

(10) Patent No.: US 7,863,511 B2
(45) Date of Patent: Jan. 4, 2011

(54) SYSTEM FOR AND METHOD OF GENERATING AUDIO SEQUENCES OF PRESCRIBED DURATION

(75) Inventor: Guy W. W. McNally, Los Altos, CA (US)

(73) Assignee: Avid Technology, Inc., Burlington, MA (US)

( * ) Notice: Subject to any disclaimer, the term of this patent is extended or adjusted under 35 U.S.C. 154(b) by 429 days.

(21) Appl. No.: 12/069,088

(22) Filed: Feb. 7, 2008

(65) Prior Publication Data
US 2008/0190268 A1 Aug. 14, 2008

Related U.S. Application Data

(60) Provisional application No. 60/900,411, filed on Feb. 9, 2007.

(51) Int. Cl.
G10H 1/36 (2006.01)
A63H 5/00 (2006.01)

(52) U.S. Cl. .............................. 84/610; 84/609; 84/615; 84/634; 84/649; 84/650; 84/653; 84/666

(58) Field of Classification Search .................. None
See application file for complete search history.

(56) References Cited

U.S. PATENT DOCUMENTS 5,355,762 A * 10/1994 Tabata .......................... 84/609
5,663,517 A * 9/1997 Oppenheim ................... 84/649
5,877,445 A 3/1999 Hufford et al.
6,211,453 B1 * 4/2001 Kurakake ...................... 84/609
6,452,083 B2 * 9/2002 Pachet et al. ................... 84/609
7,169,996 B2 * 1/2007 Georges et al. ............... 84/609
2004/0089137 A1 * 5/2004 Georges et al. ............... 84/609
2004/0089138 A1 * 5/2004 Georges et al. ............... 84/609
2004/0089139 A1 * 5/2004 Georges et al. ............... 84/609
2004/0089140 A1 * 5/2004 Georges et al. ............... 84/609
2006/0180007 A1 * 8/2006 McClinsey ..................... 84/645

FOREIGN PATENT DOCUMENTS

JP 2004 272163 9/2004
WO WO 2006/005567 1/2006

OTHER PUBLICATIONS

Cubase SX/SL, Music Creation and Production System, Getting Started Manuel, Steinberg Media Technologies GmbH, 2003, pp. 1-6, 5-58, 6-70, 6-71, 15-192, and 15-194.
Cubase SE, Music Creation and Production System, Operation Manual, Media Technologies GmbH, 2004, pp. 1-7, 5-108-113, 28-552, 553, 565, 558, 31-580-582.
Sequencing with Cubase SX, "Introduction to MIDI Sequencing with Cubase SX", Jan. 2003, pp. 1-3.

* cited by examiner

*Primary Examiner*—Marlon T Fletcher
(74) *Attorney, Agent, or Firm*—Oliver Strimpel

(57) ABSTRACT

A system and method for automatically generating a composed audio output sequence of a prescribed, utilizing a unique marker syntax that provides compatibility with MIDI standards and permits musical integrity preservation during automatic audio output sequence generation.

26 Claims, 13 Drawing Sheets

```
                         027 Blue Wednesday
MThd | Format=1 | # of Tracks=10 | Division=480

Track #0 ******************************************
  Time     Event
  1: 1:  0 |Track Name  | len=18   |
           0x30 0x32 0x37 0x20 0x42 0x6C 0x75 0x65 0x20 0x57 0x65    <027 Blue We>
           0x64 0x6E 0x65 0x73 0x64 0x61 0x79                        <dnesday>
          |Tempo        | BPM=97   | micros\quarter=618556
          |Time Sig     | 6/8      | MIDI-clocks\click=24 | 32nds\quarter=8
  3: 1:  0 |Marker      | len=2    |
           0x49 0x31                                                  <I1>
          |Marker       | len=48   |
           0x56 0x31 0x20 0x7B 0x42 0x6C 0x75 0x65 0x20 0x57 0x65    <V1 {Blue We>
           0x64 0x6E 0x65 0x73 0x64 0x61 0x79 0x7D 0x20 0x5B 0x49    <dnesday} [I>
           0x34 0x41 0x31 0x41 0x32 0x41 0x33 0x41 0x34 0x42 0x31    <4A1A2A3A4B1>
           0x42 0x32 0x42 0x33 0x43 0x31 0x43 0x32 0x41 0x35 0x41    <B2B3C1C2A5A>
           0x36 0x4F 0x31 0x5D                                        <6O1]>
          |Marker       | len=51   |
           0x58 0x47 0x20 0x28 0x30 0x3A 0x34 0x30 0x2C 0x30 0x29    <XG (0:40,0)>
           0x28 0x31 0x3A 0x34 0x30 0x2C 0x30 0x29 0x28 0x32 0x3A    <(1:40,0)(2:>
           0x37 0x32 0x2C 0x30 0x29 0x28 0x35 0x3A 0x39 0x33 0x2C    <72,0)(5:93,>
           0x30 0x29 0x28 0x37 0x3A 0x39 0x38 0x2C 0x30 0x29 0x28    <0)(7:98,0)(>
           0x38 0x3A 0x39 0x38 0x2C 0x30 0x29                        <8:98,0)>
          |Marker       | len=143  |
           0x48 0x20 0x7B 0x42 0x6C 0x75 0x65 0x20 0x57 0x65 0x64    <H {Blue Wed>
           0x6E 0x65 0x73 0x64 0x61 0x79 0x20 0x4D 0x65 0x64 0x6C    <nesday Medl>
           0x65 0x79 0x7D 0x20 0x5B 0x49 0x31 0x49 0x35 0x41 0x31    <ey} [I1I5A1>
           0x41 0x32 0x41 0x33 0x41 0x34 0x42 0x31 0x42 0x32 0x42    <A2A3A4B1B2B>
           0x33 0x49 0x36 0x43 0x31 0x43 0x32 0x41 0x35 0x41 0x36    <3I6C1C2A5A6>
           0x4F 0x31 0x49 0x38 0x41 0x37 0x41 0x38 0x41 0x39 0x41    <O1I8A7A8A9A>
           0x31 0x30 0x41 0x31 0x31 0x42 0x34 0x42 0x35 0x42 0x36    <10A11B4B5B6>
           0x43 0x33 0x43 0x34 0x49 0x31 0x32 0x41 0x31 0x32 0x41    <C3C4I12A12A>
           0x31 0x33 0x41 0x31 0x34 0x4F 0x35 0x49 0x31 0x38 0x41    <13A14O5I18A>
           0x31 0x35 0x41 0x31 0x36 0x41 0x31 0x37 0x41 0x31 0x38    <15A16A17A18>
           0x42 0x37 0x42 0x38 0x49 0x31 0x39 0x42 0x39 0x42 0x31    <B7B8I19B9B1>
           0x30 0x42 0x31 0x31 0x42 0x39 0x43 0x35 0x43 0x36 0x43    <0B11B9C5C6C>
           0x37 0x43 0x38 0x43 0x39 0x41 0x31 0x39 0x4F 0x39 0x5D    <7C8C9A19O9]>
  4: 1:  0 |Marker      | len=2    |
           0x49 0x32                                                  <I2>
  6: 1:  0 |Marker      | len=2    |
           0x49 0x33                                                  <I3>
  9: 1:  0 |Marker      | len=2    |
           0x49 0x34                                                  <I4>
 13: 1:  0 |Marker      | len=40   |
           0x49 0x35 0x20 0x7B 0x53 0x68 0x6F 0x75 0x6C 0x64 0x27    <I5 {Should'>
           0x76 0x65 0x20 0x4C 0x65 0x66 0x74 0x7D 0x20 0x5B 0x49    <ve Left} [I>
           0x35 0x41 0x31 0x41 0x32 0x41 0x34 0x49 0x35 0x41 0x31    <5A1A2A4I5A1>
           0x41 0x32 0x41 0x34 0x4F 0x33 0x5D                        <A2A4O3]>
 21: 1:  0 |Marker      | len=37   |
           0x49 0x36 0x20 0x7B 0x49 0x20 0x44 0x69 0x64 0x6E 0x27    <I6 {I Didn'>
           0x74 0x20 0x4B 0x6E 0x6F 0x77 0x7D 0x20 0x5B 0x49 0x36    <t Know} [I6>
           0x41 0x35 0x41 0x36 0x43 0x32 0x49 0x36 0x41 0x35 0x41    <A5A6C2I6A5A>
           0x36 0x4F 0x33 0x5D                                        <6O3]>
 29: 1:  0 |Marker      | len=41   |
           0x49 0x37 0x20 0x7B 0x46 0x61 0x6C 0x6C 0x65 0x6E 0x20    <I7 {Fallen >
           0x42 0x72 0x65 0x61 0x74 0x68 0x7D 0x20 0x5B 0x49 0x37    <Breath} [I7>
           0x42 0x31 0x42 0x32 0x42 0x33 0x43 0x31 0x49 0x37 0x42    <B1B2B3C1I7B>
           0x31 0x42 0x32 0x42 0x33 0x4F 0x33 0x5D                   <1B2B3O3]>
 37: 1:  0 |Marker      | len=5    |
           0x41 0x31 0x20 0x53 0x52                                   <A1 SR>
 41: 1:  0 |Marker      | len=5    |
           0x41 0x32 0x20 0x53 0x52                                   <A2 SR>
 45: 1:  0 |Marker      | len=5    |
```

*FIG. 5A*

027 Blue Wednesday

```
                0x41 0x33 0x20 0x53 0x52                              <A3 SR>
 53: 1:  0 |Marker      | len=6   |
                0x41 0x34 0x20 0x4C 0x53 0x52                         <A4 LSR>
 69: 1:  0 |Marker      | len=5   |
                0x42 0x31 0x20 0x53 0x52                              <B1 SR>
 77: 1:  0 |Marker      | len=5   |
                0x42 0x32 0x20 0x53 0x52                              <B2 SR>
 85: 1:  0 |Marker      | len=6   |
                0x42 0x33 0x20 0x4C 0x53 0x52                         <B3 LSR>
101: 1:  0 |Marker      | len=6   |
                0x43 0x31 0x20 0x4C 0x53 0x52                         <C1 LSR>
105: 1:  0 |Marker      | len=6   |
                0x43 0x32 0x20 0x4C 0x53 0x52                         <C2 LSR>
109: 1:  0 |Marker      | len=6   |
                0x41 0x35 0x20 0x4C 0x53 0x52                         <A5 LSR>
117: 1:  0 |Marker      | len=5   |
                0x41 0x36 0x20 0x53 0x52                              <A6 SR>
133: 1:  0 |Marker      | len=2   |
                0x4F 0x31                                             <O1>
137: 1:  0 |Marker      | len=2   |
                0x4F 0x32                                             <O2>
140: 1:  0 |Marker      | len=2   |
                0x4F 0x33                                             <O3>
142: 1:  0 |Marker      | len=2   |
                0x4F 0x34                                             <O4>
143: 1:  0 |Marker      | len=0   |
151: 1:  0 |Marker      | len=2   |
                0x49 0x38                                             <I8>
           |Marker      | len=58  |
                0x56 0x32 0x20 0x7B 0x4F 0x72 0x64 0x69 0x6E 0x61 0x72 <V2 {Ordinar>
                0x79 0x20 0x44 0x69 0x73 0x6D 0x61 0x79 0x7D 0x20 0x5B <y Dismay} [>
                0x49 0x38 0x41 0x37 0x41 0x38 0x41 0x39 0x41 0x31 0x30 <I8A7A8A9A10>
                0x41 0x31 0x31 0x42 0x34 0x42 0x35 0x42 0x36 0x43 0x33 <A11B4B5B6C3>
                0x43 0x34 0x41 0x31 0x32 0x41 0x31 0x33 0x41 0x31 0x34 <C4A12A13A14>
                0x4F 0x35 0x5D                                        <O5]>
152: 1:  0 |Marker      | len=2   |
                0x49 0x39                                             <I9>
154: 1:  0 |Marker      | len=3   |
                0x49 0x31 0x30                                        <I10>
157: 1:  0 |Marker      | len=3   |
                0x49 0x31 0x31                                        <I11>
161: 1:  0 |Marker      | len=50  |
                0x49 0x31 0x32 0x20 0x7B 0x4D 0x79 0x20 0x53 0x77 0x65 <I12 {My Swe>
                0x65 0x74 0x20 0x56 0x6F 0x69 0x64 0x7D 0x20 0x5B 0x49 <et Void} [I>
                0x31 0x32 0x41 0x31 0x32 0x41 0x31 0x33 0x41 0x31 0x34 <12A12A13A14>
                0x43 0x33 0x49 0x31 0x32 0x41 0x31 0x32 0x41 0x31 0x33 <C3I12A12A13>
                0x41 0x31 0x34 0x4F 0x37 0x5D                         <A14O7]>
169: 1:  0 |Marker      | len=44  |
                0x49 0x31 0x33 0x20 0x7B 0x53 0x74 0x6F 0x6C 0x65 0x6E <I13 {Stolen>
                0x20 0x42 0x72 0x65 0x61 0x74 0x68 0x7D 0x20 0x5B 0x49 < Breath} [I>
                0x31 0x33 0x42 0x34 0x42 0x35 0x42 0x36 0x43 0x34 0x49 <13B4B5B6C4I>
                0x31 0x33 0x42 0x34 0x42 0x35 0x42 0x36 0x4F 0x35 0x5D <13B4B5B6O5]>
177: 1:  0 |Marker      | len=58  |
                0x49 0x31 0x34 0x20 0x7B 0x53 0x70 0x6F 0x6B 0x65 0x20 <I14 {Spoke >
                0x54 0x6F 0x6F 0x20 0x53 0x6F 0x6F 0x6E 0x7D 0x20 0x5B <Too Soon} [>
                0x49 0x31 0x34 0x41 0x31 0x31 0x41 0x37 0x41 0x38 0x41 <I14A11A7A8A>
                0x39 0x41 0x31 0x30 0x49 0x31 0x34 0x41 0x31 0x31 0x41 <9A10I14A11A>
                0x37 0x41 0x38 0x41 0x39 0x41 0x31 0x30 0x49 0x31 0x34 <7A8A9A10I14>
                0x4F 0x35 0x5D                                        <O5]>
185: 1:  0 |Marker      | len=5   |
                0x41 0x37 0x20 0x53 0x52                              <A7 SR>
189: 1:  0 |Marker      | len=5   |
                0x41 0x38 0x20 0x53 0x52                              <A8 SR>
```

*FIG. 5B*

```
                         027 Blue Wednesday
193: 1:  0 |Marker       | len=5    |
         0x41 0x39 0x20 0x53 0x52                            <A9 SR>
201: 1:  0 |Marker       | len=6    |
         0x41 0x31 0x30 0x20 0x53 0x52                       <A10 SR>
203: 1:  0 |Marker       | len=7    |
         0x41 0x31 0x31 0x20 0x4C 0x53 0x52                  <A11 LSR>
219: 1:  0 |Marker       | len=6    |
         0x42 0x34 0x20 0x4C 0x53 0x52                       <B4 LSR>
227: 1:  0 |Marker       | len=6    |
         0x42 0x35 0x20 0x4C 0x53 0x52                       <B5 LSR>
235: 1:  0 |Marker       | len=6    |
         0x42 0x36 0x20 0x4C 0x53 0x52                       <B6 LSR>
251: 1:  0 |Marker       | len=5    |
         0x43 0x33 0x20 0x53 0x52                            <C3 SR>
255: 1:  0 |Marker       | len=5    |
         0x43 0x34 0x20 0x53 0x52                            <C4 SR>
259: 1:  0 |Marker       | len=6    |
         0x41 0x31 0x32 0x20 0x53 0x52                       <A12 SR>
267: 1:  0 |Marker       | len=6    |
         0x41 0x31 0x33 0x20 0x53 0x52                       <A13 SR>
275: 1:  0 |Marker       | len=6    |
         0x41 0x31 0x34 0x20 0x53 0x52                       <A14 SR>
291: 1:  0 |Marker       | len=2    |
         0x4F 0x35                                           <O5>
295: 1:  0 |Marker       | len=2    |
         0x4F 0x36                                           <O6>
298: 1:  0 |Marker       | len=2    |
         0x4F 0x37                                           <O7>
300: 1:  0 |Marker       | len=2    |
         0x4F 0x38                                           <O8>
301: 1:  0 |Marker       | len=0    |
311: 1:  0 |Marker       | len=3    |
         0x49 0x31 0x35                                      <I15>
         |Marker         | len=61   |
         0x56 0x33 0x20 0x7B 0x4E 0x6F 0x20 0x43 0x6F 0x6E 0x73 <V3 {No Cons>
         0x65 0x71 0x75 0x65 0x6E 0x63 0x65 0x7D 0x20 0x5B 0x49 <equence} [I>
         0x31 0x38 0x41 0x31 0x35 0x41 0x31 0x36 0x41 0x31 0x37 <18A15A16A17>
         0x41 0x31 0x38 0x42 0x37 0x42 0x38 0x42 0x39 0x42 0x31 <A18B7B8B9B1>
         0x30 0x43 0x35 0x43 0x36 0x43 0x37 0x43 0x38 0x43 0x39 <0C5C6C7C8C9>
         0x41 0x31 0x39 0x4F 0x39 0x5D                       <A19O9]>
312: 1:  0 |Marker       | len=3    |
         0x49 0x31 0x36                                      <I16>
314: 1:  0 |Marker       | len=3    |
         0x49 0x31 0x37                                      <I17>
317: 1:  0 |Marker       | len=3    |
         0x49 0x31 0x38                                      <I18>
321: 1:  0 |Marker       | len=43   |
         0x49 0x31 0x39 0x20 0x7B 0x57 0x61 0x72 0x6D 0x20 0x53 <I19 {Warm S>
         0x68 0x65 0x65 0x74 0x73 0x7D 0x20 0x5B 0x49 0x31 0x39 <heets} [I19>
         0x42 0x37 0x42 0x38 0x42 0x39 0x43 0x39 0x49 0x31 0x39 <B7B8B9C9I19>
         0x42 0x37 0x42 0x38 0x42 0x39 0x4F 0x31 0x31 0x5D    <B7B8B9O11]>
329: 1:  0 |Marker       | len=47   |
         0x49 0x32 0x30 0x20 0x7B 0x48 0x65 0x61 0x72 0x74 0x20 <I20 {Heart >
         0x43 0x69 0x72 0x63 0x6C 0x65 0x73 0x7D 0x20 0x5B 0x49 <Circles} [I>
         0x32 0x30 0x43 0x37 0x43 0x38 0x43 0x39 0x43 0x35 0x49 <20C7C8C9C5I>
         0x32 0x30 0x43 0x37 0x43 0x38 0x43 0x39 0x43 0x35 0x4F <20C7C8C9C5O>
         0x31 0x32 0x5D                                      <12]>
337: 1:  0 |Marker       | len=44   |
         0x49 0x32 0x31 0x20 0x7B 0x42 0x61 0x64 0x20 0x49 0x64 <I21 {Bad Id>
         0x65 0x61 0x7D 0x20 0x5B 0x49 0x32 0x31 0x42 0x31 0x30 <ea} [I21B10>
         0x42 0x31 0x31 0x41 0x31 0x35 0x41 0x31 0x38 0x42 0x31 <B11A15A18B1>
         0x30 0x42 0x31 0x31 0x41 0x31 0x38 0x4F 0x31 0x31 0x5D <0B11A18O11]>
345: 1:  0 |Marker       | len=6    |
```

*FIG. 5C*

```
                       027 Blue Wednesday
     0x41 0x31 0x35 0x20 0x53 0x52                    <A15 SR>
349: 1:  0 |Marker      | len=6   |
     0x41 0x31 0x36 0x20 0x53 0x52                    <A16 SR>
353: 1:  0 |Marker      | len=6   |
     0x41 0x31 0x37 0x20 0x53 0x52                    <A17 SR>
361: 1:  0 |Marker      | len=7   |
     0x41 0x31 0x38 0x20 0x4C 0x53 0x52                  <A18 LSR>
377: 1:  0 |Marker      | len=2   |
     0x42 0x37                                        <B7>
385: 1:  0 |Marker      | len=2   |
     0x42 0x38                                        <B8>
393: 1:  0 |Marker      | len=2   |
     0x42 0x39                                        <B9>
409: 1:  0 |Marker      | len=3   |
     0x42 0x31 0x30                                   <B10>
417: 1:  0 |Marker      | len=3   |
     0x42 0x31 0x31                                   <B11>
425: 1:  0 |Marker      | len=5   |
     0x43 0x35 0x20 0x53 0x52                         <C5 SR>
429: 1:  0 |Marker      | len=5   |
     0x43 0x36 0x20 0x53 0x52                         <C6 SR>
433: 1:  0 |Marker      | len=6   |
     0x43 0x37 0x20 0x4C 0x53 0x52            <C7 LSR>
441: 1:  0 |Marker      | len=6   |
     0x43 0x38 0x20 0x4C 0x53 0x52            <C8 LSR>
449: 1:  0 |Marker      | len=5   |
     0x43 0x39 0x20 0x53 0x52                         <C9 SR>
453: 1:  0 |Marker      | len=7   |
     0x41 0x31 0x39 0x20 0x4C 0x53 0x52                  <A19 LSR>
469: 1:  0 |Marker      | len=2   |
     0x4F 0x39                                        <O9>
473: 1:  0 |Marker      | len=3   |
     0x4F 0x31 0x30                                   <O10>
476: 1:  0 |Marker      | len=3   |
     0x4F 0x31 0x31                                   <O11>
478: 1:  0 |Marker      | len=3   |
     0x4F 0x31 0x32                                   <O12>
479: 1:  0 |Marker      | len=0   |
481: 1:  0 |Marker      | len=1   |
     0x45                                   <E>
     |End of track|

Track #1 ********************************************
  Time    Event
  1: 1:  0 |Track Name  | len=21  |
     0x43 0x6C 0x61 0x73 0x73 0x69 0x63 0x20 0x4E 0x61 0x74 <Classic Nat>
     0x75 0x72 0x61 0x6C 0x20 0x44 0x72 0x75 0x6D 0x73      <ural Drums>
         |Controller | chan= 1  | contr=Volume H | value=127
         |Controller | chan= 1  | contr=Pan H | value= 64
  3: 6:  3 |On Note     | chan= 1 | pitch=F#1    | vol=118
         6 |On Note     | chan= 1 | pitch=D 1    | vol=84
        23 |Off Note    | chan= 1 | pitch=d 1    | vol=0
        34 |On Note     | chan= 1 | pitch=D 1    | vol=72
        48 |Off Note    | chan= 1 | pitch=d 1    | vol=64
        56 |On Note     | chan= 1 | pitch=D 1    | vol=54
        70 |Off Note    | chan= 1 | pitch=d 1    | vol=64
        78 |On Note     | chan= 1 | pitch=D 1    | vol=40
        87 |Off Note    | chan= 1 | pitch=f#1    | vol=0
        92 |Off Note    | chan= 1 | pitch=d 1    | vol=64
        97 |On Note     | chan= 1 | pitch=D 1    | vol=35
       111 |Off Note    | chan= 1 | pitch=d 1    | vol=64
       126 |On Note     | chan= 1 | pitch=D 1    | vol=31
       139 |Off Note    | chan= 1 | pitch=d 1    | vol=64
```

FIG. 5D

```
                        027 Blue Wednesday
  152 |On Note       | chan= 1  | pitch=D 1    | vol=29
        166 |Off Note      | chan= 1  | pitch=d 1    | vol=64
        171 |On Note       | chan= 1  | pitch=D 1    | vol=22
        185 |Off Note      | chan= 1  | pitch=d 1    | vol=64
        199 |On Note       | chan= 1  | pitch=D 1    | vol=12
        213 |Off Note      | chan= 1  | pitch=d 1    | vol=64
        238 |On Note       | chan= 1  | pitch=D 1    | vol=12
  4: 1: 11 |Off Note       | chan= 1  | pitch=d 1    | vol=64
  5: 6: 3 |On Note         | chan= 1  | pitch=F#1    | vol=118
         6 |On Note        | chan= 1  | pitch=D 1    | vol=84
        23 |Off Note       | chan= 1  | pitch=d 1    | vol=0
        34 |On Note        | chan= 1  | pitch=D 1    | vol=72
>>
>>
         22 |Off Note      | chan= 1  | pitch=d 1    | vol=0
        210 |Off Note      | chan= 1  | pitch=c 1    | vol=0
  6: 6 |On Note | chan= 1  | pitch=A#1    | vol=62
         8 |On Note        | chan= 1  | pitch=C 1    | vol=90
           |On Note        | chan= 1  | pitch=C#2    | vol=62
        207 |Off Note      | chan= 1  | pitch=a#1    | vol=0
        210 |Off Note      | chan= 1  | pitch=c 1    | vol=0
           |Off Note       | chan= 1  | pitch=c#2    | vol=0
  478: 1: 8 |On Note       | chan= 1  | pitch=C#2    | vol=62
           |On Note        | chan= 1  | pitch=C 1    | vol=90
           |On Note        | chan= 1  | pitch=A#1    | vol=90
        209 |Off Note      | chan= 1  | pitch=c#2    | vol=0
        210 |Off Note      | chan= 1  | pitch=c 1    | vol=0
           |Off Note       | chan= 1  | pitch=a#1    | vol=0
           |End of track|

Track #2 ********************************************
   Time     Event
   1: 1: 0 |Track Name  | len=16  |
           0x46 0x69 0x6E 0x67 0x65 0x72 0x20 0x4A 0x61 0x7A 0x7A  <Finger Jazz>
           0x20 0x42 0x61 0x73 0x73                                < Bass>
           |Controller  | chan= 2  | contr=Volume H | value= 75
           |Controller  | chan= 2  | contr=Pan H    | value= 64
   3: 1: 0 |On Note             | chan= 2  | pitch=G#1    | vol=119
     3:199 |Off Note            | chan= 2  | pitch=g#1    | vol=0
      4: 0 |On Note | chan= 2   | pitch=A 1    | vol=118
      6: 0 |On Note | chan= 2   | pitch=A#1    | vol=104
         8 |Off Note            | chan= 2  | pitch=a 1    | vol=0
        233 |Off Note           | chan= 2  | pitch=a#1    | vol=0
   4: 4: 0 |On Note             | chan= 2  | pitch=A 4    | vol=110
      6: 0 |On Note | chan= 2   | pitch=E 2    | vol=111
   5: 1: 0 |On Note             | chan= 2  | pitch=G#1    | vol=119
         38 |Off Note           | chan= 2  | pitch=e 2    | vol=0
     2:186 |Off Note            | chan= 2  | pitch=a 4    | vol=0
     3:199 |Off Note            | chan= 2  | pitch=g#1    | vol=0
>>
>>
        118 |Off Note           | chan= 2  | pitch=f#1    | vol=0
        142 |On Note            | chan= 2  | pitch=B 1    | vol=115
        224 |Off Note           | chan= 2  | pitch=b 1    | vol=0
      2: 0 |On Note | chan= 2   | pitch=F#1    | vol=118
        239 |Off Note           | chan= 2  | pitch=f#1    | vol=0
      3: 0 |On Note | chan= 2   | pitch=E 1    | vol=118
        229 |Off Note           | chan= 2  | pitch=e 1    | vol=0
      4: 0 |On Note | chan= 2   | pitch=D#1    | vol=115
      5:189 |Off Note           | chan= 2  | pitch=d#1    | vol=0
      6: 0 |On Note | chan= 2   | pitch=B 1    | vol=122
  477: 6:231 |Off Note          | chan= 2  | pitch=b 1    | vol=0
  478: 1: 0 |On Note            | chan= 2  | pitch=B 1    | vol=112
```

FIG. 5E

027 Blue Wednesday

```
 6:223 |Off Note    | chan= 2  | pitch=b 1   | vol=0
      |End of track|

Track #3 ********************************************
   Time    Event
  1: 1:  0 |Track Name | len=23   |
         0x47 0x4D 0x20 0x45 0x6C 0x65 0x63 0x74 0x72 0x69 0x63 <GM Electric>
         0x20 0x4A 0x61 0x7A 0x7A 0x20 0x47 0x75 0x69 0x74 0x61 < Jazz Guita>
         0x72                                                    <r>
         |Controller | chan= 3  | contr=Volume H | value= 75
         |Controller | chan= 3  | contr=Pan H | value= 74
  3: 2: 34 |On Note    | chan= 3  | pitch=E 2   | vol=110
     3:232 |On Note    | chan= 3  | pitch=F#2   | vol=119
     4:169 |Pitch Wheel| chan= 3  | bend=264
       181 |Pitch Wheel| chan= 3  | bend=792
       193 |Pitch Wheel| chan= 3  | bend=1056
       216 |Pitch Wheel| chan= 3  | bend=264
       229 |Pitch Wheel| chan= 3  | bend=0
     5:236 |Off Note   | chan= 3  | pitch=f#2   | vol=0
     6:  1 |On Note    | chan= 3  | pitch=A 2   | vol=117
        31 |Off Note   | chan= 3  | pitch=e 2   | vol=0
       238 |Off Note   | chan= 3  | pitch=a 2   | vol=0
  4: 1:  6 |Pitch Wheel| chan= 3  | bend=1585
        16 |On Note    | chan= 3  | pitch=E 2   | vol=112
           |On Note    | chan= 3  | pitch=B 2   | vol=115
        18 |Pitch Wheel| chan= 3  | bend=528
        28 |On Note    | chan= 3  | pitch=D 3   | vol=122
        29 |Pitch Wheel| chan= 3  | bend=0
     2:158 |Pitch Wheel| chan= 3  | bend=792
>>
>>
>>
>>
       238 |On Note    | chan=10  | pitch=E 2   | vol=94
     3:196 |Off Note   | chan=10  | pitch=e 2   | vol=0
     4:  0 |On Note    | chan=10  | pitch=D 2   | vol=103
       211 |Off Note   | chan=10  | pitch=d 2   | vol=0
     5:  0 |On Note    | chan=10  | pitch=E 2   | vol=97
       150 |Off Note   | chan=10  | pitch=e 2   | vol=0
     6:  0 |On Note    | chan=10  | pitch=D 2   | vol=97
       150 |Off Note   | chan=10  | pitch=d 2   | vol=0
       170 |Off Note   | chan=10  | pitch=b 4   | vol=0
       179 |Off Note   | chan=10  | pitch=d 4   | vol=0
       181 |Off Note   | chan=10  | pitch=g#4   | vol=0
       185 |Off Note   | chan=10  | pitch=b 3   | vol=0
           |End of track|
```

*FIG. 5F*

SYSTEM FOR AND METHOD OF GENERATING AUDIO SEQUENCES OF PRESCRIBED DURATION

CROSS-REFERENCE TO RELATED APPLICATIONS

This application claims the benefit of priority to U.S. Provisional Patent Application No. 60/900,411, filed 9 Feb. 2007, the contents of which are incorporated herein by reference in their entirety.

BACKGROUND

The present invention relates to the automatic generation of a musical piece in a selected genre and having a desired duration.

In a typical audiovisual environment, it is often desirable to shorten or lengthen the performance duration of, for example, a portion of a sound track associated with a video clip of a home or cinematic movie or a television commercial. Video sequences are often repetitively edited before an aesthetically satisfactory sequence is achieved. An audio source segment associated with the video sequence must similarly be edited to form an audio output sequence that is synchronized to match the duration of the edited video output sequence.

Exemplary video editing products, such as Pinnacle Studio (Pinnacle Systems, Inc., Mountain View, Calif.), are not typically equipped with the powerful audio editing capabilities of music production applications such as, for example, the Cubase System SX (Steinberg Media Technologies GmbH) application and its progeny. Such music production applications allow segmentation of a musical piece into discrete audio blocks, which can be manually configured in a desired order by an author of an audio sequence.

Applications for shortening or lengthening the performance duration of a music piece include systems that rely on audio block looping, on uniformly regulating the reproduction speed of the piece, and/or on rearranging the audio blocks in orders that do not necessarily preserve the musical integrity, or theme, of the edited music piece.

SUMMARY

A system and method is provided for automatically generating a sequence of audio data for producing an audio output sequence that has a prescribed duration and that is based upon a chosen musical piece such as, for example, a desired song.

The audio output sequence is automatically composed on a block-by-block basis, utilizing marked audio blocks (also referred to herein as audio "parts") associated with the chosen musical piece and stored in a data storage library. A list of musical selection options is generated that satisfy a chosen musical style and a prescribed target duration. In response to a choice of one of the musical selections, the audio sequence is automatically composed. The composed audio sequence typically extends over a plurality of musical time units, its duration matching the target duration. The target duration may be prescribed by directly entering a time value into the system, or may be inherited from a video sequence with which the audio sequence is associated. In the latter embodiment, the system may be used in conjunction with a video editing application, wherein editing the length of the video sequence results in a dynamic adjustment of the available musical selections from which a user may choose to accompany the edited video sequence. Once a user chooses a musical selection, the audio sequence is automatically generated and previewed for the user through a playback device. If satisfactory to the user, the audio output sequence may be stored and/or placed in a timeline synchronized with the edited video sequence.

An audio output sequence of practically any prescribed length may be automatically generated, with or without looping, while preserving the thematic musical integrity of the chosen musical selection. To this end, the data storage library is populated with data files including MIDI data and associated metadata used by the system to identify a list of available audio selections meeting the genre and target duration criteria, and to generate one or more audio output sequences. Authors add editorial annotations to ("mark up") the data files that facilitate the subsequent automatic generation of the audio output sequence, using a syntax that defines musical structure and functionality of small segments of audio data, referred to herein as "audio parts". Audio parts may be comprised of single segments, or longer data structures comprised of a plurality of audio data segments with unique identification information.

Accordingly, in one aspect, a system is provided for populating the data storage library with musical selections associated with a musical piece, such as a song. The system includes means for permitting an author to define a plurality of audio parts of desired durations that are associated with a musical piece, to assign marker data to each audio part indicative of a musical structure type and optionally one or more part properties, and to define one or more audio "selections" of the musical piece and one or more "templates" associate with the musical piece. Each audio selection is comprised of a plurality of "intro" parts, one or more "outro" parts, and optionally one or more "main" parts suitable for ordering in the audio selection between a particular intro part and an outro part. Each template is comprised of a unique template type identifier and a text string representing a preferred ordering of the audio parts. The system further comprises means for exporting the audio parts, marker data, selections, templates and MIDI data associated with the audio parts to the data storage library. A detailed description of an exemplary syntax useful in the system is provided below.

In another embodiment, there is provided a method and a computer program product for using a computer system to perform the actions described above.

In another aspect, a system is provided for automatically generating the composed audio output sequence having the prescribed duration. This system includes the data storage library already populated with exported audio parts, marker data, selections, templates and associated MIDI data associated with one or more musical pieces or songs. The system further comprises a user interface permitting a user to prescribe a target duration, and to choose a musical style, a musical piece from among the musical pieces (or songs) available in the data storage library that conform to the chosen style, and an audio selection from among the audio selections in the data storage library that conform to the chosen style and that have an available range of durations that accommodate or encompass the target duration. The user interface also permits the user to preview the chosen audio selection. The system includes means for identifying (via listing in the user interface) the audio selections conforming to the chosen style and target duration criteria. The system optionally, but preferably, adjusts this list dynamically in response to changes in the target duration. For example, if the system is being used in conjunction with a video editing application such as, for example, Pinnacle Studio, the length of an edited video sequence may change numerous times, which may result in the addition or deletion of musical sequences from the list of available sequences, if a greater or lesser number of musical selections can accommodate the target duration inherited from the edited video sequence. The system is further comprised of a sequence composer for automatically composing an output sequence of audio parts that conforms to the chosen selection, wherein the sequence is derived from the template associated with the chosen musical selection, and wherein each audio output sequence includes an intro part, an outro part, and optionally one or more main parts in a preferred ordering. Once a musical selection is chosen, the sequence composer generates the output audio sequence for preview by the user. If the author of the data storage library entries has properly marked the audio parts and otherwise defined the associated metadata associated with a musical piece, the automatic lengthening or shortening of the audio output by the sequence composer will not affect the musical thematic integrity of the music composed.

The automatically composed audio output sequence has a duration that substantially matches the target duration. The meaning of substantially matching includes an exact match in some embodiments. In other embodiments, the system makes fine adjustments in the composed sequence duration through one or more of a variety of techniques, including adding silence data to the composed audio output sequence of parts, trimming one or more of the parts comprising the output sequence, and/or globally adjusting the tempo of all of the parts of the output sequence upon preview rendering. Further, the sequence composer may compensate for playback trailing effects by targeting an output sequence duration that is slightly shorter than the prescribed target duration, i.e., in order to permit a natural-sounding decay or to avoid cutting off reverberation at the end of a piece.

In another embodiment, there is provided a method and a computer program product for using a computer system to perform the actions described above.

Other features and advantages of the present invention will become readily apparent to artisans from the following description of exemplary embodiments, taken in conjunction with the accompanying drawings, which illustrate, by way of example, principles of the present invention.

BRIEF DESCRIPTION OF THE DRAWINGS

FIGS. 5A-5E illustrate the contents of an exemplary project file including audio block and marker data, authored with an authoring system in accordance with the present invention.

DETAILED DESCRIPTION OF THE INVENTION

A. Overview

Figure 1:
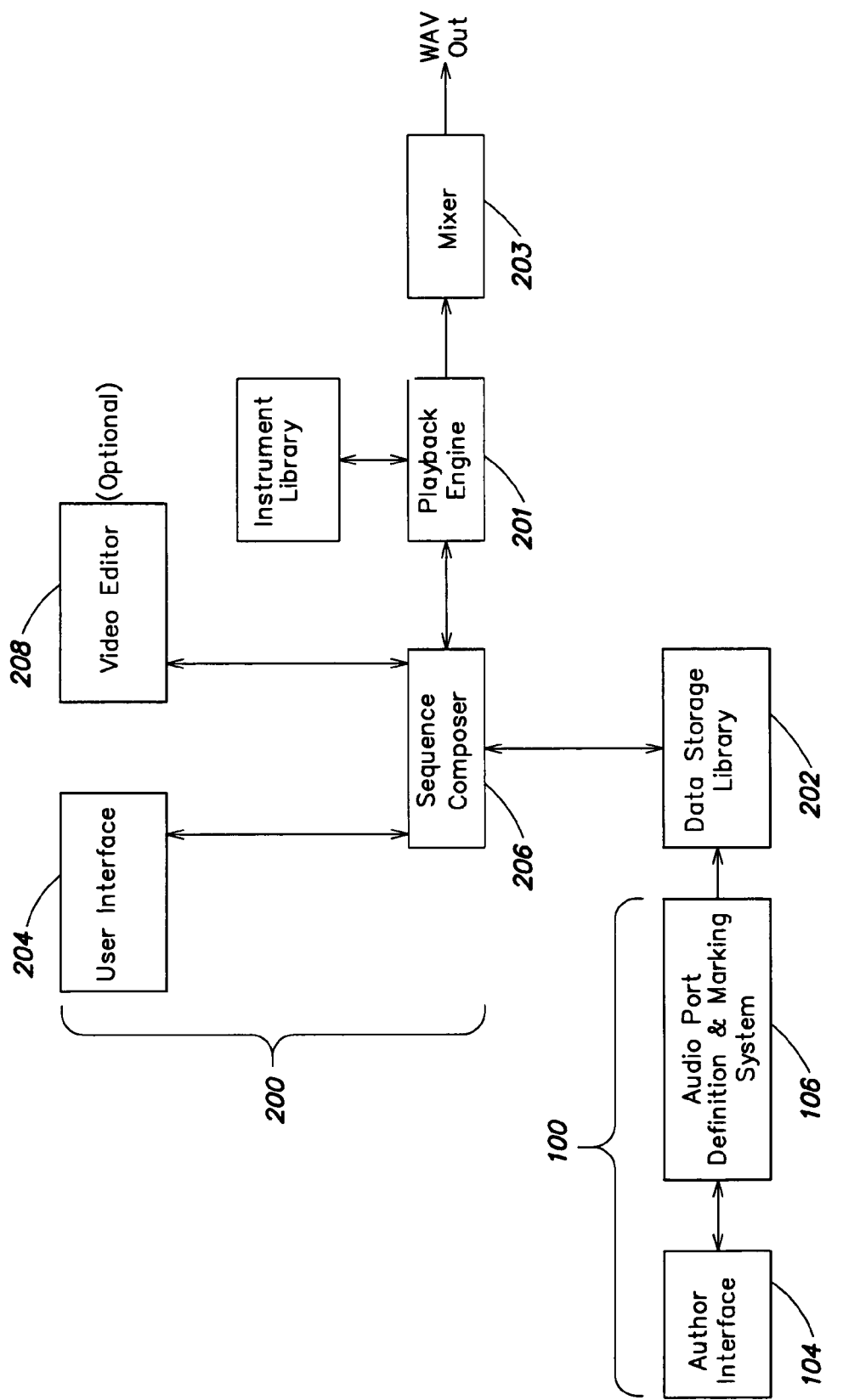
FIG. 1 is a block diagram illustrating a configuration and working environment for an authoring system and an automatic audio output sequence composing system in accordance with an embodiment of the invention.

Referring now to FIG. 1, a block diagram is shown of a configuration capable of performing several functions of the invention. Within the configuration is an authoring system 100, including an authoring interface 104 and an audio part definition and marking system 106. Authoring system 100 permits an author to populate a data storage library 202 with audio "selections" associated with a musical piece such as, for example, a song. The audio selections are contained within project files, the complete contents of which will be described below. Also depicted in the exemplary configuration is a composing system 200 for automatically generating a composed audio output sequence associated with the musical piece and having practically any user-prescribed duration. The primary components of composing system 200 include the data storage library 202 populated with the audio selections, a user interface 204 and a sequence composer 206. Composed output audio sequences are output to a playback engine 201 and mixer 203.

In a preferred embodiment, the definition/marking system 106 and sequence composer 206 are comprised of computer-executed software applications, executing on computer processors that would typically, but not necessarily, be integrated into distinct computers. As such, the following description relates to computer systems. However, different computer platforms or hardware-only implementations are also considered within the scope of the invention.

The user interfaces 104, 204 are each electronically coupled to their respective computers for inputting choices and/or instructions to the computers. For the purposes of clarity, the term "author" is used to refer to a user of interface 104, through which definition/marking system 106 is utilized to populate data storage library 202, and the term "user" is used to refer to a user of interface 204, through which sequence composer 206 is utilized to automatically generate a composed audio sequence of a user-prescribed duration. As will be described below, the user may prescribe the target duration for the composed audio sequence by directly entering a time value through user interface 204. Alternatively, the user may indirectly prescribe the target duration, in configurations wherein composing system 200 is used in conjunction with an optional video editing system such as, for example, the Pinnacle Systems STUDIO application. In such embodiments, an alteration of the length of an edited video clip or sequence is determined by sequence composer 206, and results in a corresponding, dynamic change in the target duration for the audio output sequence that is intended to accompany the edited video clip.

In general, authoring system 100 is utilized by the author to define blocks of audio data associated with a song, herein referred to as "audio parts", which in various orderings define musical compositions thematically related to the song, as well as metadata associated with the audio parts. In the description below, definition/marking system 106 is described in the context of a CUBASE SX 3.1 (Steinberg Media Technologies GmbH) software application (or a later version), and the marked up audio parts are described in the context of CUBASE project MIDI files employing a unique syntax (described below), while retaining compatibility with standard Midi files as defined by the MIDI 1.0 Spec, July 1998. However, all of the techniques disclosed could be implemented using any application permitting the definition and unconstrained marking of audio parts, and the authored projects could equally be authored as WAV files. The only technical distinctions, which should be readily apparent to those of skill in the art, would be in exporting the author-defined metadata to the data storage library 202, and in parsing the metadata for the purposes of automatically composing the user-defined audio sequence(s).

Once the data storage library 202 is populated with project files including audio parts and artistically appropriate marker tracks (described below) associated with one or more musical pieces, composing system 200 permits the user to prescribe the target duration and to choose from among one or more musical styles, and then automatically composes an output audio sequence (song) based on these inputs utilizing the data storage library 202 entries. Preferably, as the target duration is changed (either directly by the user, or through inheritance of the video clip length), the audio output song duration is correspondingly dynamically changed.

B. The Authoring Environment

The process of specifying characteristics of music and sound is both musical and technical. This process is used to provide as much information as possible about each piece of music or sound so that the sequence composer 206 can make informed, musical decisions, when it manipulates the music according to requests from users.

Figure 2:
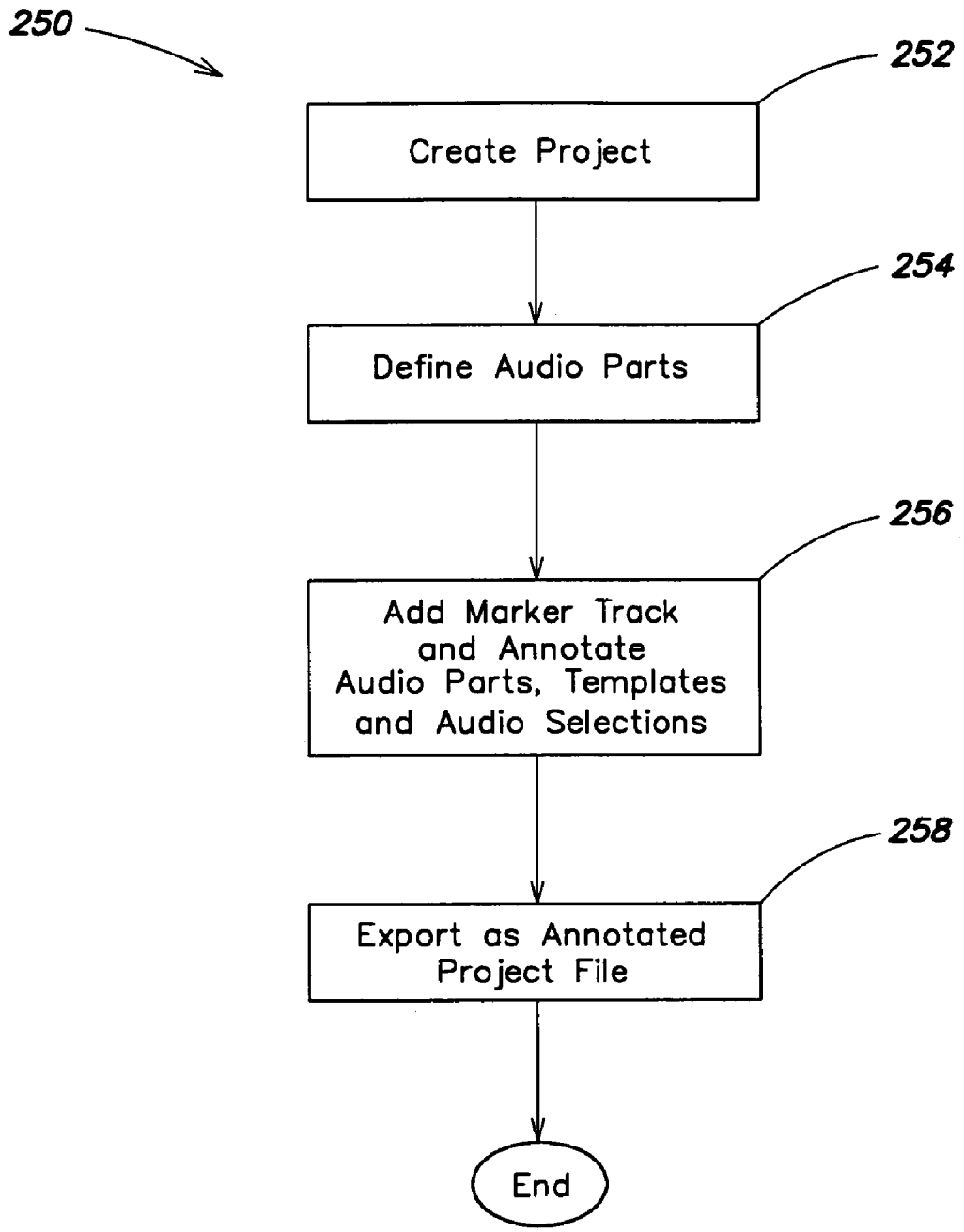
FIG. 2 is a simplified flow chart illustrating an authoring process in accordance with the present invention.

FIG. 2 shows a simplified flow chart illustrating an exemplary process 250 for populating data storage library 202 with audio selections associated with a musical piece. In step 252, the authoring system permits an author to create a project file related to a musical piece. In step 254, the author uses the authoring system to define a plurality of audio parts of desired durations from the musical piece.

In step 256, the author adds a marker track to the project file, and assigns marker data to each audio part indicative of a musical structure type of the audio part, and optionally one or more properties that the part possesses. Exemplary musical structure types include verses, choruses, bridges, ends, intros, outros, headers, sections, versions, effects and silence. Exemplary part properties include the suitability of the audio part to be trimmed, faded out, looped, used as a step-in block, and/or used as a step-out block. The author further defines one or more musically thematic templates, each comprised of a template type identifier and a text string representing a preferred ordering of one or more of the audio parts, and one or more audio selections, each comprised of a plurality of intro parts of distinct durations, one or more outro parts of distinct durations, and optionally one or more main audio parts of distinct durations suitable for use in the audio selection between a particular intro part and a particular outro part. Optionally, the authoring system permits the author to associate effects parameters with the audio parts that are readable by a rendering engine to control mixer playback. In this manner, the present invention uses audio parts as constructs to contain global control data, such as a reverb. The authoring system also optionally permits definition of playback automation information associated with one or more of the audio parts and readable by a rendering engine so as to control audio output sequence playback.

Finally in step 258, once the author has completed defining and annotating, the authoring system exports the plurality of audio parts, marker data, audio selections, templates and sound file (e.g., MIDI) data associated with the musical piece as a project file to the data storage library.

An implementation of the authoring system 100 will now be described in detail.

Cubase SX provides an author with means for defining numerous data structures and associated metadata related to a musical piece. The "Cubase SX/SL 3 Operation Manual", which describes in detail existing functionality in the application, is incorporated herein by reference. Only those Cubase features relevant to the exemplary embodiment of authoring system 100 will be discussed here. A .cpr project is the basic file type in Cubase, and typically includes the audio, WAV or MIDI, automation, and settings for a piece of music. The authoring system 100 leverages Cubase's capability to permit a great deal of customization by an author.

Figure 3:
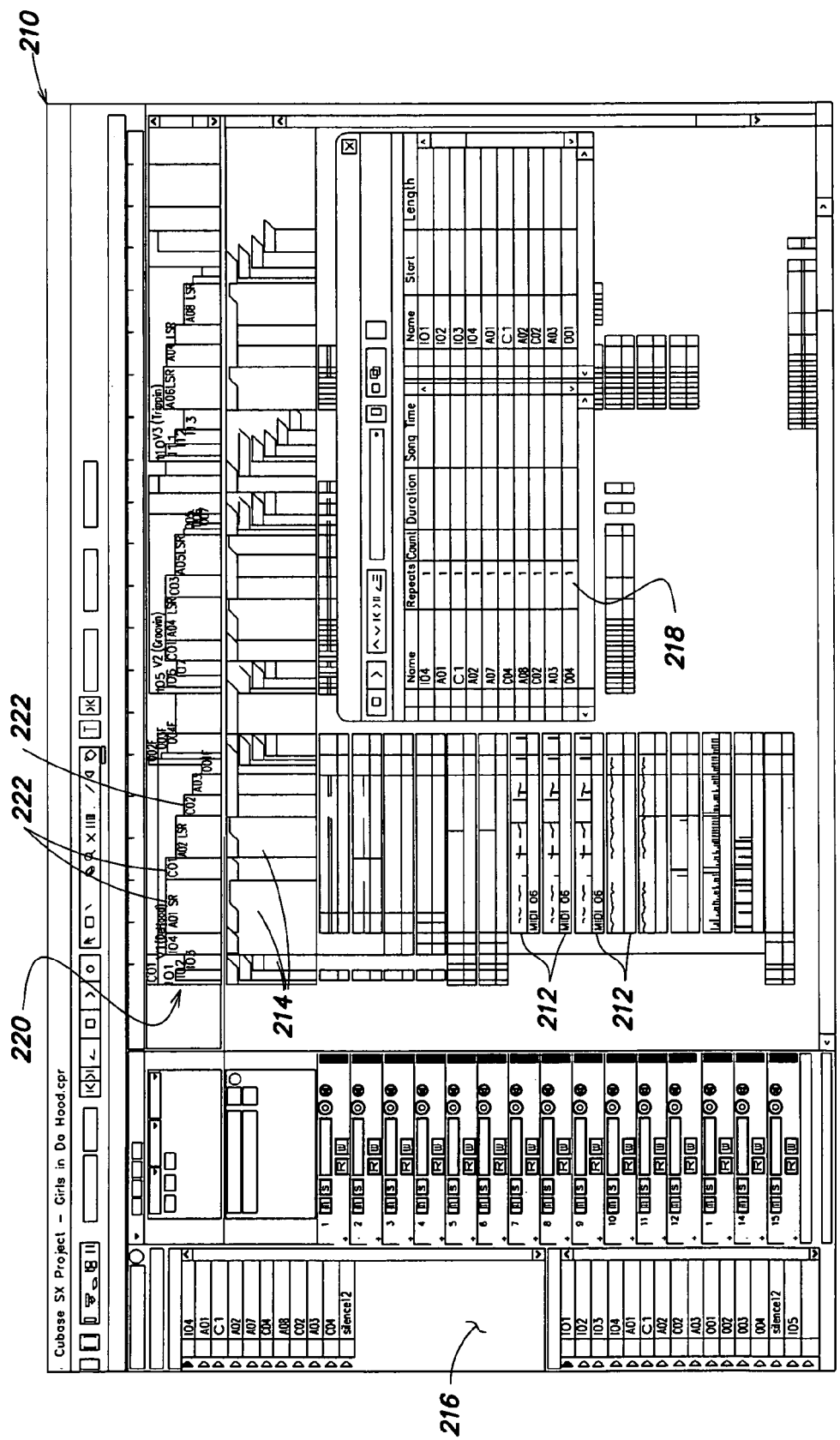
FIG. 3 is a computer display screen shot illustrating an exemplary user interface for defining audio parts, play orders and marker track data associated with a musical piece.
Figure 4:
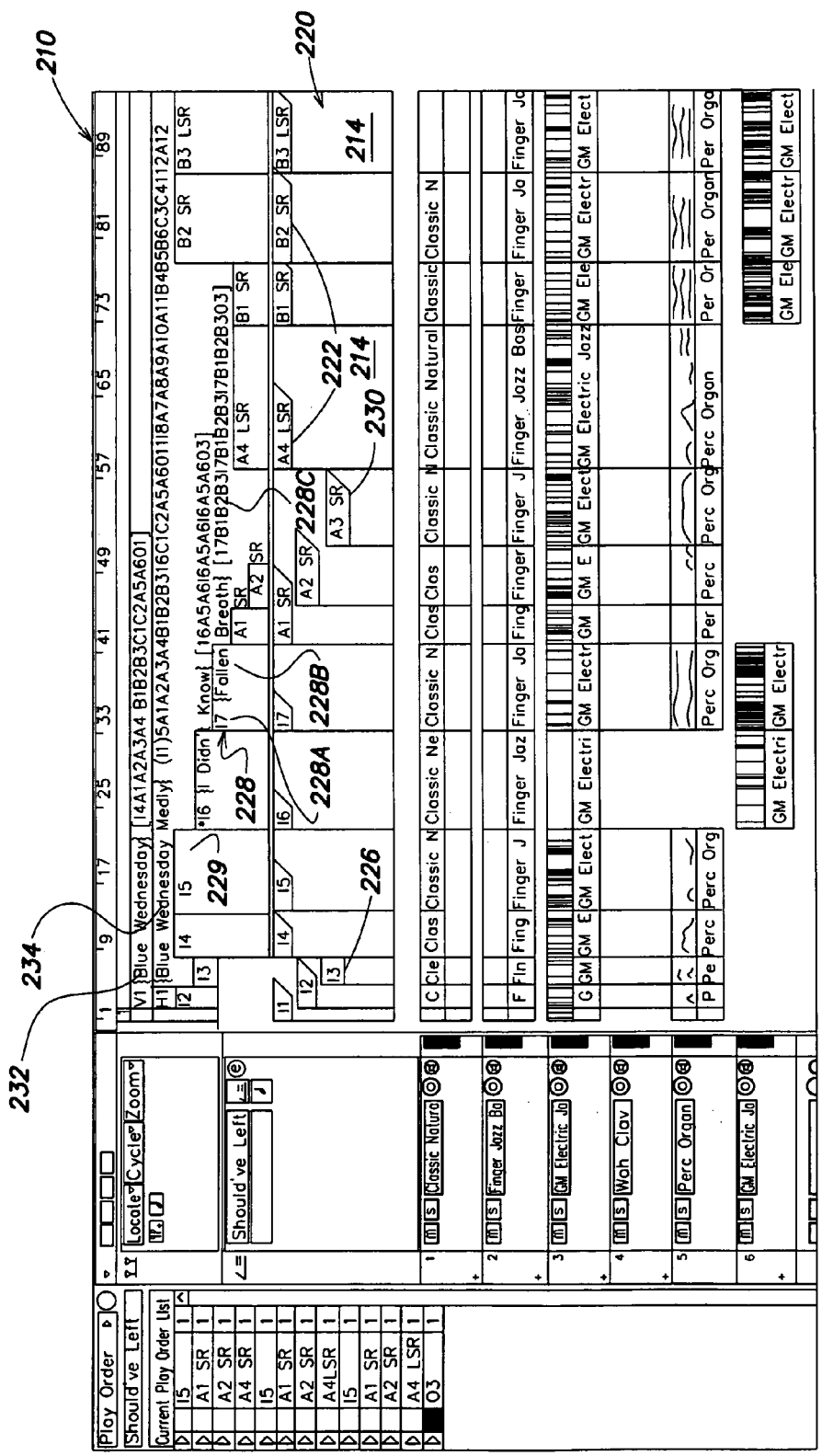
FIG. 4 is another computer display screen shot of the exemplary user interface.

With reference to FIG. 3, which illustrates a screen shot 210 of a Cubase SX window, an author creates a MIDI Project by inputting a musical piece, represented as multiple channels of MIDI data 212, and defining audio parts 214, i.e. audio blocks of the musical piece, with desired durations using a Play Order Track function. Once the audio parts are defined, they may be arranged (with reference to FIG. 3) in any preferred ordering in a Play Order List 216 using a Play Order Editor 218. Multiple play orders can be easily created and previewed for musicality. Audio parts should be contiguous, in order to permit calculation of each part's duration. Once the play orders are approved, the audio part and play order information are annotated. With reference to FIG. 4, the author utilizes the Cubase Marker Track function to add a marker track 220 to the project. In the marker track 220, markers 222 are assigned to each audio part 214 and/or groupings 224 of audio parts (also referred to as audio parts.) The marker data (embedded in the MIDI file) contain all the instructions needed by the sequence composer 206 to perform its audio output sequence generation, and to alter the characteristics of the resultant new soundfile in various ways. The marker files as described in this example are therefore an "overlay" technology as opposed to an "embedded" technology, although they do not exclude combining the digital information file with the digital instruction file to form a new digital information file in an 'embedded' technology. The marker files do not directly interact with or alter the existing MIDI files in any way.

In a preferred, non-limiting example syntax, each marker 222 is a Cubase Cycle Marker with a text string of the form, Mnn$\Delta$part properties$\Delta$\{marker name\}$\Delta$[template]

where,
M represents a musical structure type,
nn is a unique identifier (e.g., a number between 1 and 99),
part properties is an optional indication of one or more properties of the audio part,
marker name is an optional marker name text string (enclosed in { }),
template is an optional text string used in longer audio parts comprised of a listing of selected other audio parts, and represents a preferred ordering of the other audio parts, and
$\Delta$ represents a space in the marker text string.

Table One illustrates preferred, non-limiting examples of a variety of possible musical structure types and corresponding part properties assignable to an audio part.

TABLE ONE

| Type | Meaning | Comment | Part Properties |
|---|---|---|---|
| A | Verse | start of verse. | U, L, S, R |
| B | Chorus | start of chorus. | U, L, S, R |
| C | Bridge | start of bridge. | U, L, S, R |
| E | End | any parts after this marker will be ignored | |
| I | Intro | start of variant n of intro. Optional { } and [ ]. | T, S |

TABLE ONE-continued

| Type | Meaning | Comment | Part Properties |
|---|---|---|---|
| O | Outro | start of variant n of outro. | U, F, R |
| H | Header | style template. Optional { } and [ ]. | |
| S | Section | any contiguous part with Step-in and Step-out | |
| V | Version | start of new version. | |
| X | Effect | global FX parameter settings | 0-100 |
| unnamed | Silence | will be ignored. | |

In this exemplary syntax, intro part types indicate that the audio part is suitable as an introduction to an audio selection, and outro part types are indicative that the audio part is suitable as an ending of an audio selection. Intros are comprised of single audio parts, of which some, referred to as "extended" intros, are typically long enough (e.g., 15 to 30 seconds) to create musical variations with a distinct "feel" or theme, particularly when combined with other carefully selected audio parts. Defining multiple intros and outros provides a mechanism by which sequence composer 206 can make small adjustments in the duration of composed audio output sequences. Intro parts and outro parts, taken together, should provide durations in the range of 1 to 7 musical bars. For songs at slow tempo (e.g., say <100 bpm) extra short intro parts of 0.5 bars are helpful. An intro part may optionally be designated as supporting a crash start (trimmable), and outro parts may be allowed to fade out (fadeable).

As the term is used herein, "main" parts are suitable for use in an audio selection between a particular intro part and a particular outro part, such as verses, choruses and bridges.

A "version" is a self-contained play order of audio parts that has multiple short intros and outros of different lengths, and that uses as many of the audio parts as possible (but preferably not extended intro parts) for a typical play duration of approximately 3-4 minutes. Extended length intros provide the primary musical themes for generating interesting variations when combined with selected audio parts. Each song project file typically contains multiple versions that can be dramatically different even though broadly complying with a specified musical style. It is suggested that within each version there should be at least three (3) extended intros, each having its own name and template. With reference to FIG. 4, in Version 1 232 of the song Blue Wednesday, I1-I4 represent short intro parts, I5-I7 represent extended intro parts. I5 is also used as an extended intro for the variation "Should've Left" 229. Medleys, such as Blue Wednesday Medley 234, permit the generation of more complex output songs, and can extend for significant durations (e.g., 12 minutes or longer.) Each extended intro, version and medley is defined to include a template (such as, for example, template 228C), which is a text string representing a preferred ordering of audio parts. When automatically composing output audio sequences, sequence composer 206 will adhere as closely as possible to the ordering represented in a selected template, and will only compose new orderings when no template is associated with a user's chosen audio selection.

In the exemplary syntax, the optional audio part properties may include one or more of:

U Upbeat—signifying that the audio part includes an additional 1 beat from the preceding audio part;

L Loopable—signifying that the audio part can be looped;

T Trimmable—signifying that, if necessary, the audio part can be crash started up to 4 beats in (only applies to intro parts);

F Fadeable—signifying that the audio part can be optionally faded out (only applies to outro parts);

S Step-in—signifying that the audio part represents a preferable audio part to segue after an intro part or prior section part; and R Step-out—signifying that the audio part represents a preferable audio part to segue before another section part or outro part.

With reference again to FIG. 4, some examples of markers will be described. For example, audio part 226 represents a simple intro I3 with no optionally assigned part properties. Audio part 228 also has no optionally assigned part properties, but represents an extended intro part, including an "Intro" structure type 228A, a unique numerical identifier ("7"), a marker name 228B ("Fallen Breath"), and a template 228C comprised of a text string indicating a preferred ordering of audio blocks ("I7B1B2B3I7B1B2B3I7B1B2B3O3"). Audio part 230 represents a verse (a type of main audio part) audio part that has been identified as suitable for stepping-in ("S") or stepping-out ("R"). As the term is used herein, an audio "selection" refers to musical data structures such as, for example, version V1 232 and medley H 234 of "Blue Wednesday", that each are comprised of a plurality of intro parts having distinct durations, one or more outro parts having distinct durations, and optionally (but preferably) one or more main audio parts of distinct durations.

The authoring system 100 permits the composing skills of the author to be captured by defining audio parts and templates in a manner that preserves thematic musical integrity. The sequence composer 206 automatically generates audio output sequences (songs) from the templates. If the templates are appropriately defined, the duration of the composed output sequences can be dynamically adjusted to accommodate longer or shorter target durations while preserving the musical theme. The author creates audio parts of the various types that have different lengths, or durations, that can be edited and arranged by sequence composer 206 (as described below) in multiple ways to obtain output audio sequences matching user choices and prescribed target durations.

Once the author is done annotating the audio parts and defining templates for a musical piece, the marked-up MIDI file is exported from Cubase to the data storage library. FIGS. 5A-5F illustrate a text conversion of the binary content of the MIDI file for the "Blue Wednesday" song as partially shown in FIG. 4. In particular, FIG. 5A through a portion of FIG. 5D illustrate the marker track data associated with each of the audio parts, versions and medley associated with the song "Blue Wednesday". The remainder of FIG. 5D, and FIGS. 5E-5F, illustrate the associated Event Track data, including instrument and playback control information. The exported file automatically includes certain information, such as the project name, tempo and time signature.

It should be readily apparent to artisans that the syntax described above represents merely a starting point for audio part marking. For example, additional metadata could be assigned to the audio parts that is readable by the playback engine 201 so as to control audio output playback. For example, dynamic changes in volume and pan automation are definable and stored with the MIDI Event Track data, as shown in FIGS. 5D-5F. There are many other parameters that can be automated with this scheme, e.g. any of the parameters represented by 127 MIDI Controller Codes.

C. Automatic Song Generation

Figure 6:
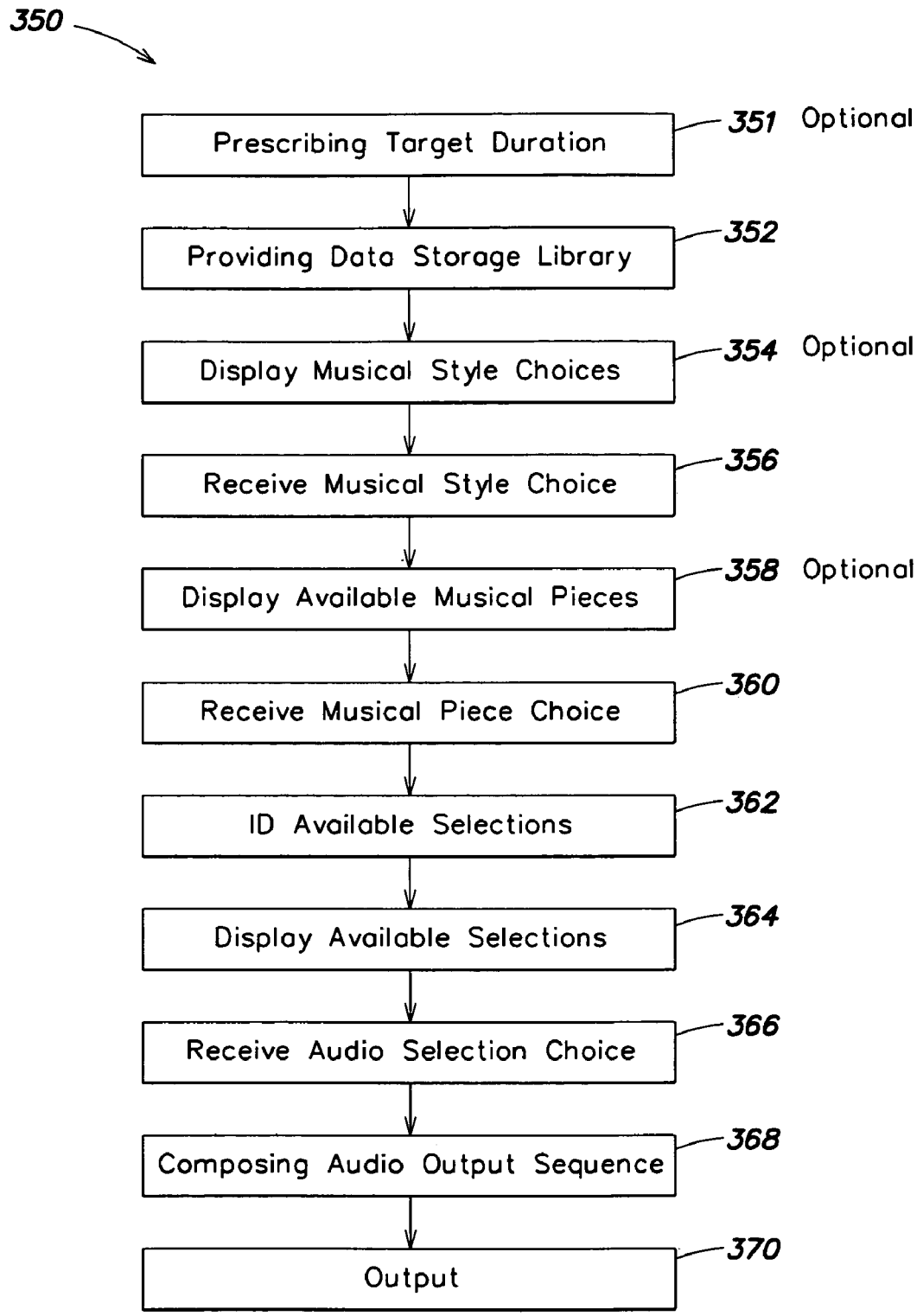
FIG. 6 is a simplified flow chart illustrating an exemplary automatic audio output sequence composing process in accordance with the present invention.
Figure 7:
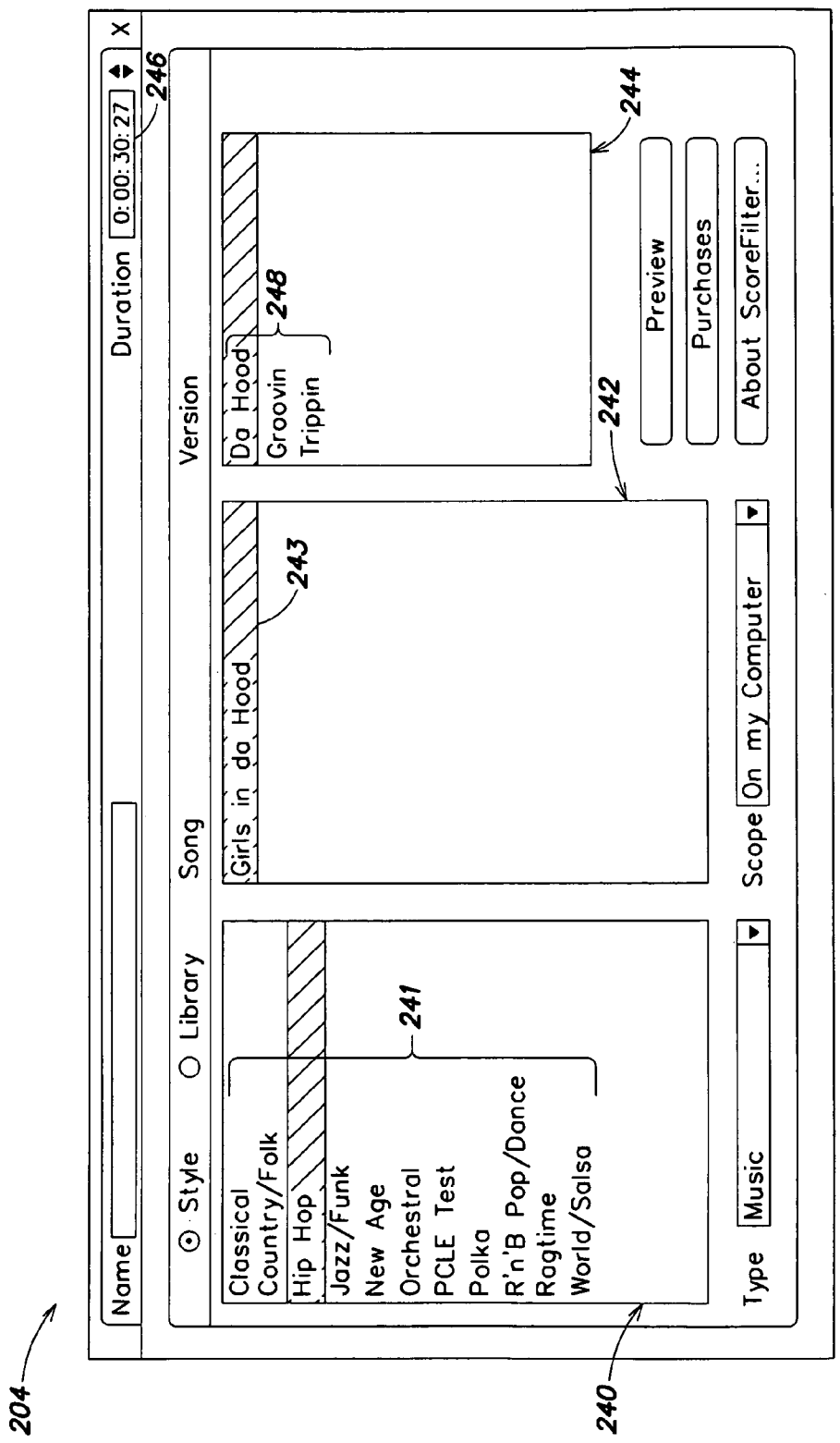
FIG. 7 is a computer display screen shot illustrating an exemplary user interface for using the automatic audio output sequence composing system.
Figure 8:
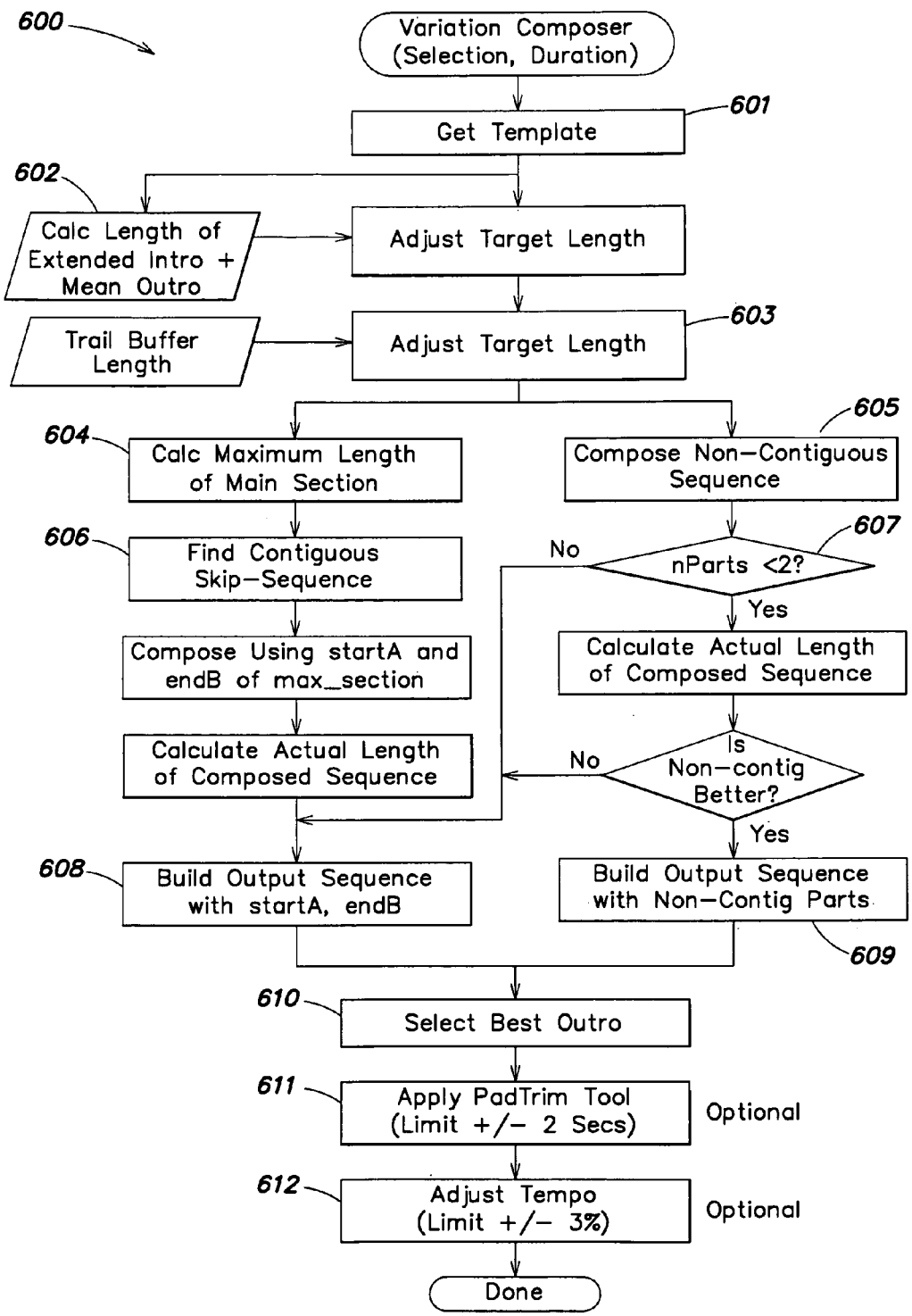
FIG. 8 is a simplified flow chart illustrating an exemplary algorithm for composing an audio output sequence given a target duration and user choice of an audio selection.

A description of the operation of composing system 200 will now be provided with reference to FIGS. 6-8.

FIG. 6 shows a simplified flow chart illustrating an exemplary process 350 for automatically generating an audio output sequence associated with a musical piece (e.g., a song) and having a prescribed duration. A number of the steps (351, 354 and 358) described preferably occur in the full usage of the composing system 200, but are optional in that the input values resulting from performance of these steps could be gathered without prompting a user of the composing system to input the values. In step 351, a target duration is prescribed. As noted above, the target duration could be directly entered by the user, or inherited from an edited video clip or sequence. Data storage library 202 is made available to sequence composer 206 (step 352), which displays a list of available musical style choices in the library 202.

Sequence composer 206 then receives (step 356) a musical style choice from the user, and in turn displays (step 358) a list of available musical pieces (or songs) in the library that conform to the chosen style. Sequence composer 206 then receives (step 360) a musical piece choice from the user. At this point, sequence composer 206 identifies (step 362) and displays (step 364) one or more audio selections in the library that conform to the chosen style and that have associated duration ranges encompassing the prescribed target duration, preferably by calculating the duration ranges of the audio selections conforming to the chosen style, and comparing those ranges to the target duration. In preferred embodiments, the list of available selections is dynamically adjusted in accordance with changes in the target duration.

In step 366, sequence composer 206 receives the user's choice of preferred audio selection, and in response, automatically generates an audio output sequence having a duration substantially matching the target duration from the template data associated with the chosen audio selection. The resultant audio output sequence is then output (step 370) for preview by the user, and/or written to an audio track in a timeline associated with the edited video sequence.

FIG. 7 illustrates an exemplary user interface 204 presented to the user of the composing system. As noted above, in preferred embodiments, user interface 204 is called up as an adjunct routine of a video editing system, at a point when the user is satisfied with the edited video clip and when musical accompaniment for the edited video clip is desired. One exemplary video editing system with which composing system may be employed is Pinnacle Systems Studio 10. The target duration for the output audio sequence is, thus, inherited from the edited video clip. In other embodiments, the target duration may be directly entered by the user in target duration field 246.

User interface 204 presents three window panes to the user, style pane 240, song pane 242, and version pane 244. Sequence composer 206 retrieves the information necessary to populate these panes with musical choices for the user from the marked up project file entries available in data storage library 202.

In operation, the user chooses a musical style from among the musical style choices 241 listed in style pane 240, and in response, sequence composer 206 lists the available musical piece(s) 243, or songs, that meet the chosen style. A XML file details the contents of the data storage library 202 and provides additional information about each song including author name, tempo (bpm), musical style, and a 25 word description. This information is displayed in the UI as a "Tool Tip", i.e. when the user's mouse hovers over a song title, the appropriate information is briefly shown. This XML file is the single method for maintaining, expanding or deleting access to items from the library. This XML file is also used by the Sequence composer 206 to identify the styles of the musical pieces 243 available in the data storage library 202. Sequence composer then identifies and lists in version pane 244 one or more audio selections 248 that conform to the chosen style and that can accommodate the prescribed target duration. Each of the audio selections 248, as noted above, includes a number of intro parts, outro parts and optionally one or more main parts. These various parts preferably have a variety of distinct durations, which permits sequence composer 206 to generate, for each audio selection, audio output sequences in a range of durations. The list of available audio selections 248 is compiled by sequence composer by identifying the audio selections conforming to the chosen style and that have respective duration ranges supporting or encompassing the prescribed target duration. In preferred embodiments, changes to the target durations (e.g., lengthening or shortening resulting from further editing of the associated video clip) result in dynamic adjustments to (e.g., pruning of) the list of available musical pieces 243 and associated audio selections 248 presented to the user.

Sequence composer 206 re-creates the audio parts and play orders by scanning the templates in the stored project files, and calculating the start, end and duration of each part from adjacent markers in the associated marker track for the project. If a template is not available for a version, variation or medley, sequence composer infers an audio part sequence from the available audio parts.

When the user chooses one of the audio selections 248, sequence composer 206 automatically generates an audio output sequence, for audio preview by the user, which substantially matches the prescribed target duration. As noted above, the audio output sequence includes an intro part, an outro part, and optionally one or more main parts in an ordering that conforms as closely as possible to the template of the chosen audio selection. As used herein, the meaning of terms "substantially matching" may include an exact match between the automatically generated output sequence and the target duration. However, in alternative embodiments, the sequence composer 206 performs additional editing steps (described below) that further refine the duration of the output sequence.

In general, sequence composer 206 scans the template associated with a chosen audio selection 248 for long, contiguous, audio part sequences marked with step-in and step-out properties. That is, it tries to minimize the number of edits to be performed, and identifies explicit indications that it is acceptable, from a musical aesthetic perspective, to edit sequences when necessary to do so. Another objective is to generate the output sequence without using looping techniques. The contiguous sequences can comprise explicitly marked Section types, or they can be assembled from contiguous audio parts of various types. A resulting main section is then combined with a suitable intro part and outro part to derive the output sequence having a duration substantially matching the prescribed target duration. In one exemplary embodiment, sequence composer 206 generates an output sequence having an approximate duration within +3% of the target duration, and then performs a final tempo adjustment to refine the output sequence duration to exactly match the target duration. In other embodiments, sequence composer employs further output sequence duration refining techniques, such as adding silence data at the end of a composed sequence and/or trimming one or more of the audio parts comprising the sequence. In another embodiment, the sequence composer composes output sequences slightly shorter than the target duration in order to provide a natural sounding decay at the end of the piece.

Once the audio output sequence is generated it is rendered (using playback engine 201 and mixer 203) for preview. When used in conjunction with a video editing system, the audio output sequence may be placed on a music track of a timeline associated with the edited video clip.

One exemplary algorithm 600 executed by sequence composer 206 for the automatic audio output sequence generation will now be described with reference to FIG. 8. It will be appreciated by those of skill in the art that alternative algorithms could be utilized, and/or a selection among distinct algorithms could be made based upon the target duration, user audio selection choice and the range of durations supported by the chosen audio selection.

An exemplary algorithm utilizes four "composer" routines, which work in similar ways, but each having a unique capability:

Stinger or ShortSong Composer.
Variation Composer
Version Composer
Medley Composer.

In general, variation composer algorithm 600 looks for a section to remove from the template associated with the chose audio selection, while preserving the longest possible outro and intro parts. For very long target durations, the main body may be looped in its entirety.

For a given selection, step 601 uses the template to find all the parts that may be used by the composer. The extended intro is located first since this anchors the theme of the variation. In step 602, durations are calculated for the extended intro, the mean value of the available outros, and in step 604 the maximum length of the main section. In 603, the target length is adjusted by the known extended intro, the computed mean outro and a trail buffer of 1 second. Two competing techniques are used to compose a main section of a length matching the target duration, the first is a contiguous sequence 606, the other is allowed to be non-contiguous 605. The contiguous method 606 looks for a section to remove such that what remains, when spliced together is the correct length. Thus there is only one edit, or departure from the composers intention. Where possible the edit will be done close to the middle of the main section so that the intros and outros are not influenced. The step-in and step-out flags may be optionally used for the best result. The non-contiguous method 605 scans all parts and allows any combination that best approximates the target length. Again, the step-in and step-out flags may be optionally used for the best result. In 607, the number of parts created in the non-contiguous sequence is totaled and if small, the method will override the contiguous result. Normally, the priority is to preserve musicality but for certain short sequences, for example less than 2, it is unlikely that a sufficiently close match can be found. The computed main section can now be added to the output sequence 608,609, and the final adjustments made. In 610, an outro is chosen that best matches the remaining time difference between the target and actual sequences. In 611, an optional pad/trim tool can add or remove content (described below). Finally, a tempo adjustment of ±3% may be used, an amount typically not noticed when comparing different rendered sequences, 612.

For short, compositions, a Pad/Trim Tool is used, as described below.

The Version Composer uses similar processing but expands the content used by the composer as the target duration is increased. The selection is typically locked while a user makes duration changes and so it is necessary to add additional parts to the template used by the composer while preserving the existing parts that identify the theme of the selection. For example, if the initial choice is a Variation and the target duration is extended, at some point the Version composer will kick in to add content and variety. The composition will start with Parts from the selected Variation to retain the theme, then segue to additional parts from the owner version, then segue back to parts from the original variation. Similarly, if expanded further, the Medley Composer will kick in. The composition will start with the Selection, work through the Version Parts and then add content and variety form the Parts in the Medley. The thresholds at which the different composers are used are determined by a scope calculation for each song. This estimates the minimum and maximum durations that can be readily implemented with the parts of each template.

The Stinger Composer uses similar processing, but creates its own template based on all the available intros and outros belonging to the version. To meet a specific target length intros/outro pairs or outro-only sequences are created. Because the compositions are so short the pad/trim tool is essential.

The pad/trim tool provides the ability to add or delete content in order to achieve a desired target duration. A sequence is lengthened by padding, i.e. adding silence after an outro. On playback, the MIDI synthesizer will typically fill the silence with the reverberant decay of the notes played, usually with very acceptable results. A sequence can be shortened in at least two ways: (1) by applying a crash start to an Intro, i.e. starting playback at an initial offset into the Part (if an intro has the trimmable property, an offset of between 1 and 4 beats may be applied; and (2) if an outro has the fadeable property, it can be shortened by applying a fade out.

The various components of the systems described herein may be implemented as a computer program (including plug-in) using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

The components of a system in accordance with the present invention may also be implemented in hardware or firmware, or a combination of hardware, firmware and software. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for automatically generating a composed audio output sequence of a prescribed duration, the composed audio sequence associated with a musical piece, comprising:

a data storage library populated with a plurality of audio parts having predetermined durations and associated with at least one musical piece, the plurality of audio parts including one or more intro parts suitable as introductions to an audio selection, one or more outro parts suitable as endings to the audio selection, and optionally one or more main parts, marker data associated with each audio part indicative of a musical structure type and optionally one or more part properties, one or more audio selections associated with the at least one musical piece, wherein each audio selection is comprised of a plurality of the intro parts having distinct durations, one or more of the outro parts having distinct durations, and optionally one or more main parts having distinct durations and suitable for use in the audio selection between a particular intro part and a particular outro part, and one or more templates associated with the one or more audio selections, each template comprised of a style identifier and text string representing a preferred ordering of one or more of the audio parts;

an interface permitting a user:
to prescribe a target duration by entering a time value for the target duration or by equating the target duration to a duration of a chosen video sequence,
to choose a musical style,
to choose a musical piece from among the at least one musical piece in
the data storage library that conform to the chosen style,
to choose an audio selection from among the audio selections in the data storage library that conform to the chosen style and that have an available duration range encompassing the target duration, and
to preview the chosen audio selection; and a sequence composer for identifying one or more audio selections to the user that conform to the chosen style and that have respective duration ranges encompassing the target duration and for automatically composing a sequence of audio parts conforming to the chosen selection, the sequence derived from the template associated with the chosen selection, each audio sequence having an intro part, an outro part, and optionally one or more main parts in a preferred ordering and further having a duration substantially matching the target duration.

2. The system of claim 1, wherein the sequence composer dynamically adjusts the choices of audio selections presented to the user in response to changes in the target duration.

3. The system of claim 1, wherein the part properties are selected from properties consisting of the suitability of the audio part to be trimmed, faded out, looped, for use as a step-in block, and for use as a step-out block.

4. The system of claim 1, wherein the musical structure types are selected from the group of musical structures consisting of a verse, chorus, bridge, end, intro, outro, header, section, version, effect, and silence.

5. The system of claim 1, wherein the sequence composer performs at least one composed sequence duration adjustment selected from adding silence data at the end of the composed sequence, trimming one or more of the audio parts, and adjusting the tempo of all of the parts of the composed sequence.

6. The system of claim 1, wherein the sequence composer composes sequences slightly shorter in duration than the target duration in order to provide a natural sounding decay at the end of the piece.

7. The system of claim 1, further comprising a playback device for previewing the composed sequences.

8. The system of claim 1, wherein the sequence composer preserves thematic musical integrity while varying the duration of the composed sequences.

9. A method of automatically generating a composed audio sequence of a prescribed duration, the composed audio sequence associated with a musical piece, comprising the steps of:

providing a data storage library populated with a plurality of audio parts having predetermined durations and associated with at least one musical piece, the plurality of audio parts including one or more intro parts suitable as introductions to an audio selection, one or more outro parts suitable as endings to the audio selection, and optionally one or more main parts, marker data associated with each audio part indicative of a musical structure type and optionally one or more part properties, one or more audio selections associated with the at least one musical piece, wherein each audio selection is comprised of a plurality of the intro parts having distinct durations, one or more of the outro parts having distinct durations, and optionally one or more main parts having distinct durations and suitable for use in the audio selection between a particular intro part and a particular outro part, and one or more templates associated with the one or more audio selections, each template comprised of a style identifier and text string representing a preferred ordering of one or more of the audio parts;

receiving a musical style choice;

receiving a musical piece choice from among the one or more musical pieces in the data storage library that conform to the chosen style;

identifying one or more audio selections that conform to the chosen style and that have associated duration ranges encompassing a target duration, wherein the target duration is specified as an explicit time duration or equated to a duration of a chosen video sequence;

displaying the identified one or more audio selections;

receiving an audio selection choice from among the displayed audio selections; and automatically composing a sequence of audio parts conforming to the chosen audio selection, the sequence derived from the template associated with the chosen audio selection, each audio sequence including an intro part, an outro part, and optionally one or more main parts in a preferred ordering and further having a duration substantially matching the target duration.

10. The method of claim 9, further comprising the step of previewing the chosen audio selection by playing back the composed sequence of audio parts associated with the chosen audio selection.

11. The method of claim 9, further comprising the step of displaying a list of available musical styles.

12. The method of claim 11, further comprising the step of displaying a list of available musical pieces conforming to each of the available musical styles.

13. The method of claim 9, wherein the identifying step comprises:

calculating duration ranges of the audio selections conforming to the chosen style; and comparing the calculated duration ranges to the target duration.

14. The method of claim 9, wherein the identifying step further comprises dynamically adjusting the list of identified audio selections in response to changes in the target duration.

15. The method of claim 9, wherein the part properties are selected from properties consisting of the suitability of the audio part to be trimmed, faded out, looped, for use as a step-in block, and for use as a step-out block.

16. The method of claim 9, wherein the musical structure types are selected from musical structures consisting of a verse, chorus, bridge, end, intro, outro, header, section, version, effect, and silence.

17. The method of claim 9, wherein the composing step further comprises at least one step of adding silence data at the end of the composed sequence, trimming one or more audio parts in the composed sequence, and adjusting the tempo of all of the parts of the composed sequence.

18. The method of claim 9, further comprising the step of providing a natural sounding decay at the end of the piece.

19. The method of claim 9, wherein the composing step preserves thematic musical integrity while varying the duration of the composed sequences.

20. A computer program product, comprising:

a computer readable medium;

computer program instructions stored on the computer readable medium that, when executed by a computer, cause the computer to perform a method for automatically generating a composed audio sequence of a prescribed duration, the composed audio sequence associated with a musical piece, the method comprising:

providing a data storage library populated with a plurality of audio parts having predetermined durations and associated with at least one musical piece, the plurality of audio parts including one or more intro parts suitable as introductions to an audio selection, one or more outro parts suitable as endings to the audio selection, and optionally one or more main parts, marker data associated with each audio part indicative of a musical structure type and optionally one or more part properties, one or more audio selections associated with the at least one musical piece, wherein each audio selection is comprised of a plurality of the intro parts having distinct durations, one or more of the outro parts having distinct durations, and optionally one or more main parts having distinct durations and suitable for use in the audio selection between a particular intro part and a particular outro part, and one or more templates associated with the one or more audio selections, each template comprised of a style identifier and text string representing a preferred ordering of one or more of the audio parts;

receiving a musical style choice;

receiving a musical piece choice from among the one or more musical pieces in the data storage library that conform to the chosen style;

identifying in a list one or more audio selections that conform to the chosen style and that have associated duration ranges encompassing a target duration, wherein the target duration is specified as an explicit time duration or equated to a duration of a chosen video sequence;

displaying the identified one or more audio selections;

receiving an audio selection choice from among the displayed audio selections; and automatically composing a sequence of audio parts conforming to the chosen audio selection, the sequence defined by the template associated with the chosen audio selection, each audio sequence including an intro part, an outro part, and optionally one or more main parts in a preferred ordering and further having a duration substantially matching the target duration.

21. The computer program product of claim 20, wherein the method performed by the computer further comprises the step of previewing the chosen audio selection by playing back the composed sequence of audio parts associated with the chosen audio selection.

22. The computer program product of claim 20, wherein the method performed by the computer further comprises the step of displaying a list of available musical styles.

23. The computer program product of claim 20, wherein the method performed by the computer further comprises the step of displaying a list of available musical pieces conforming to each of the available musical styles.

24. The computer program product of claim 20, wherein the identifying step performed by the computer further comprises:

calculating duration ranges of the audio selections conforming to the chosen style; and comparing the calculated duration ranges to the target duration.

25. The computer program product of claim 20, wherein the identifying step performed by the computer further comprises dynamically readjusting the list of identified audio selections in response to changes in the target duration.

26. The computer program product of claim 20, wherein the composing step performed by the computer further comprises at least one step of adding silence data at the end of the composed sequence, trimming the intro of the composed sequence, and adjusting the tempo of all of the parts of the composed sequence.

* * * * *